G. V. ANDERSON.
INTERNAL COMBUSTION ENGINE.
APPLICATION FILED MAY 1, 1918.

1,299,895.

Patented Apr. 8, 1919.
6 SHEETS—SHEET 1.

Fig.1.

Inventor:
Gilbert V. Anderson
By C. R. Butler
Attorney.

G. V. ANDERSON.
INTERNAL COMBUSTION ENGINE.
APPLICATION FILED MAY 1, 1918.

1,299,895.

Patented Apr. 8, 1919.
6 SHEETS—SHEET 4.

Inventor:
Gilbert V. Anderson,
By C. N. Butler
Attorney.

Inventor:
Gilbert V. Anderson,
By C. N. Butler
Attorney.

UNITED STATES PATENT OFFICE.

GILBERT V. ANDERSON, OF PHILADELPHIA, PENNSYLVANIA, ASSIGNOR OF ONE-HALF TO WILLIAM F. FISCHER, OF PHILADELPHIA, PENNSYLVANIA.

INTERNAL-COMBUSTION ENGINE.

1,299,895. Specification of Letters Patent. Patented Apr. 8, 1919.

Application filed May 1, 1918. Serial No. 231,811.

*To all whom it may concern:*

Be it known that I, GILBERT V. ANDERSON, a citizen of the United States, residing in the city of Philadelphia, county of Philadelphia, and State of Pennsylvania, have invented certain Improvements in Internal-Combustion Engines, of which the following is a specification.

My invention is an improved internal combustion engine designed primarily for obtaining increased power and efficiency and maintaining such power under varying atmospheric conditions, such as are found in the operation of air craft, the improvements being especially adapted for application to two cycle engines.

The invention is characterized by its special means for clearing the combustion chamber of exploded gas prior to the admission of live gas thereto, utilizing the live gas with minimum wastage, varying the amounts and proportions of gas and air as rendered desirable by varying conditions, maintaining the normal pressure conditions in the explosion chamber, by controlling the exhaust, with varying conditions of atmospheric pressure and operating at high speed.

Desiderata attained by my invention include improved means for controlling the gas and air, delivering them to the explosion chamber, and discharging the exploded gas.

The nature and advantages of the improvements are fully disclosed in the following description and the accompanying drawings in illustration of an embodiment thereof.

The invention, in the form thereof illustrated by the drawings, is embodied in an engine comprising the crank case 1 and the compound cylinder 2 having the lower chamber 2′ and the upper chamber 2″ of smaller diameter than that of the lower chamber.

The crank shaft 3, journaled in the case 1, has its wrist pin 3′ connected by the pitman 4 with the pin 5 of the compound piston 6 comprising the piston 6′ which works in the pressure chamber 2′ and the piston 6″ with the baffle 6ᵃ thereon which works in the explosion chamber 2″, the latter having at its lower end the inlet ports 2ᵃ and the discharge ports 2ᵇ.

The chamber 2′ has its upper end connected by a passage 7 with a valve chamber or case 8, which communicates through the port 9 with the passage 10 having the air inlet 13, and through the passage 11 with the air reservoir 12, the latter communicating with the passage 14 which discharges through the ports 2ᵃ into the chamber 2″.

A rotary valve 15 in the case 8 controls the passages 7, 9, and 11; an oscillatory valve 16 controls the air inlet 13, and oscillatory valves 17 and 18 in the reservoir 12 control the admission of air and gas respectively to the chamber 2″ through the passage 14 and ports 2ᵃ.

The body of the valve 17 is a shell having thereon the hollow journals 17′ and 17″, the former being supported in the bearing 2ᶜ on the cylinder 2 and the latter being supported on the hollow journal 18″ of the valve 18. The valve 18 has a journal 18′ which extends through and is supported by the journal 17′, its neck 18″ being journaled in the bearing 2ᵈ on the part 2.

A conduit and reservoir 19, fixed to the cylinder 2, connects the hollow journal 18″ of the valve 18 with the chamber 10′. The crank case 1 is connected through the port 20 with a valve chamber or case 21 which is connected by a passage 22 with the chamber 10′ and by a passage 23 with the gas supply. The case 21 contains the rotary valve 24 which controls the passages 20, 22, and 23, the passage 23 being throttled by an oscillatory valve 25.

The valves 16 and 25, for throttling the air and gas inlets, are connected to work in unison by providing them with the respective arms 16′ and 25′, which are connected by a link 26 containing a turnbuckle 26′ for adjusting its length, the ends of the link being connected with the respective arms so as to be adjustable along the same and the mechanism being set by a link 27 connected to the arm 16′, whereby the proportions of air and gas can be varied, as also the amounts thereof.

The valves 15, 17, 18 and 24 are operated automatically in synchronous relation by connecting them with the shaft 3. This is effected by fixing on the shaft a helical gear 28 and engaging therewith a helical gear 29 fixed on a journaled shaft 30, the latter having fixed thereon the helical gears 31, 32, 33, and 34 for operating the respective valves. The valve 15 is provided with a journaled stem 15′ having fixed thereto a helical gear 35 which meshes with the gear 31. The valve 24 is provided with a journaled stem 24′ having fixed thereto a helical gear 36 which meshes with the gear 34. The journal 17′ of the valve 17 has fixed thereto a crank 37 which is connected by a link 38 with a crank shaft 39, the latter being turned by a helical gear 40 fixed thereon and engaging the helical gear 33. The journal 18′ of the valve 18 has fixed thereto a crank 41, which is connected by a link 42 with a crank shaft 43, the latter being turned by a helical gear 44 fixed thereon and engaged by the helical gear 32.

The gear 32 is fixed to the shaft 30 by a spline 30′, which permits the gear to be adjusted along the shaft and set in the desired position by a fork 45, fixed on a journaled shaft 45′, the fork being provided with the studs 45″ engaging the collar 32′ in which revolves the hub 32″ of the gear and the shaft 45′ having fixed thereon the operating lever 46 having a detent 46′ for engaging the segment 47. The position and operation of the gas valve 18 are thus adjustable with relation to the other movable parts and operations of the engine to provide for varying conditions, particularly of the atmosphere at high altitudes.

When the engine is operating at high altitudes, as under conditions arising in the operation of aircraft, it is necessary to take in an increased amount of both air and gas to maintain the desired compression, due to the lower density of the air, which increase is obtained by constructing the engine with an air and gas pumping capacity in excess of that required for operating on the ground and admitting the desired amounts of air and gas by regulating the valves 16 and 25 as well as 18, and regulating the exhaust.

The exhaust is regulated by means of a valve 48 which revolves in a case 48′, the latter communicating with the waste gas outlet 14′ and the atmosphere. This valve is turned by a helical gear 49 fixed thereto and engaged by a helical gear 50 fixed on a journaled shaft 51 by a spline 51′, the shaft having a helical gear 52 fixed thereon and engaged by the helical gear 28. The action of the valve 48, which operates in synchronous relation with the valves 15, 17, 18 and 24, is adjusted by means of an oscillatory fork 53 provided with studs 53′ which lie in a channel 50′ of the hub 50″ on the wheel 50, the fork being fixed on a journaled shaft 54 which is rocked by a lever 55 fixed thereto and held in the desired position by the engagement of its detent 55′ with the stationary segment 56.

The crank case 1, being used as a pump chamber and it being desirable to keep this chamber small, filler piece 57 is provided therein and filler pieces 58 are secured to the crank disks 3″ and also act as counterweights for the wrist pin 3′.

Figure 1:
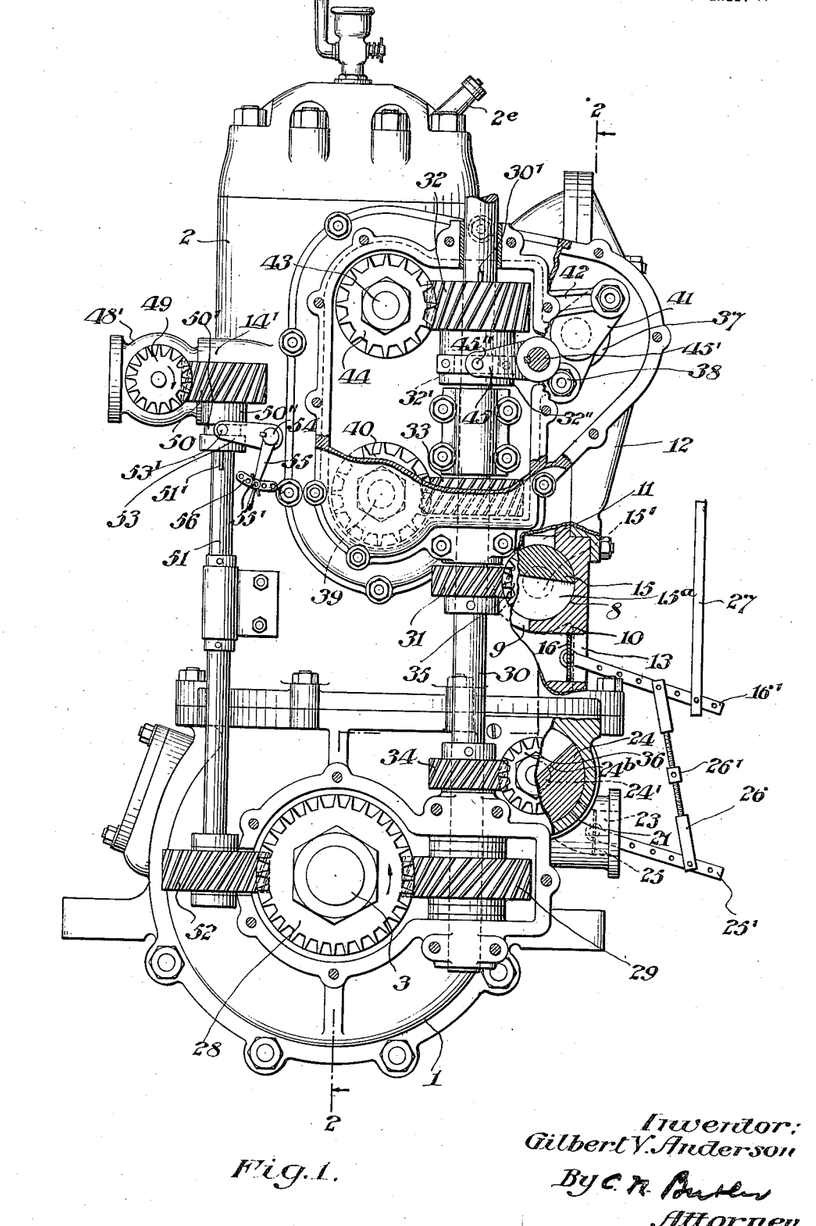
Figure 1 is a part sectional side elevation of an engine constructed in accordance with the invention.
Figure 2:
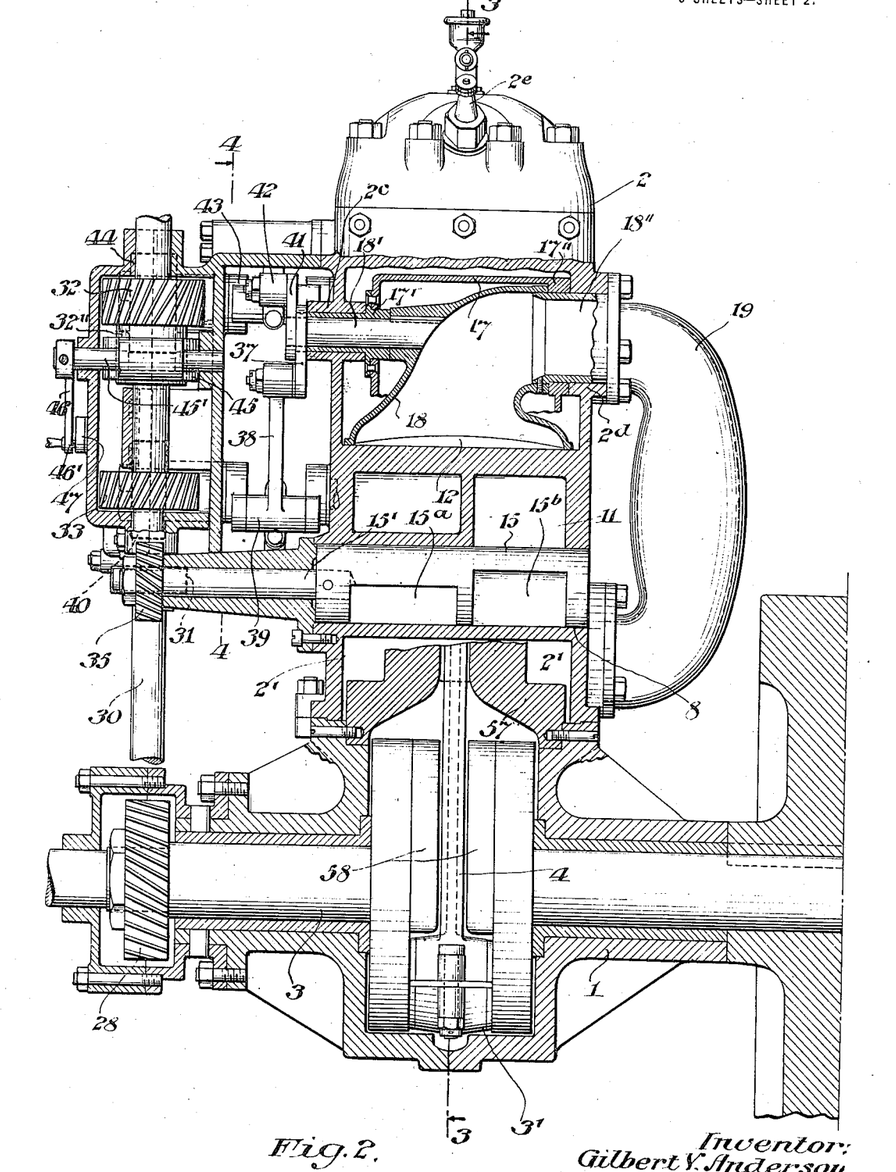
Fig. 2 is an irregular sectional view approximating the line 2—2 of Fig. 1.
Figure 3:
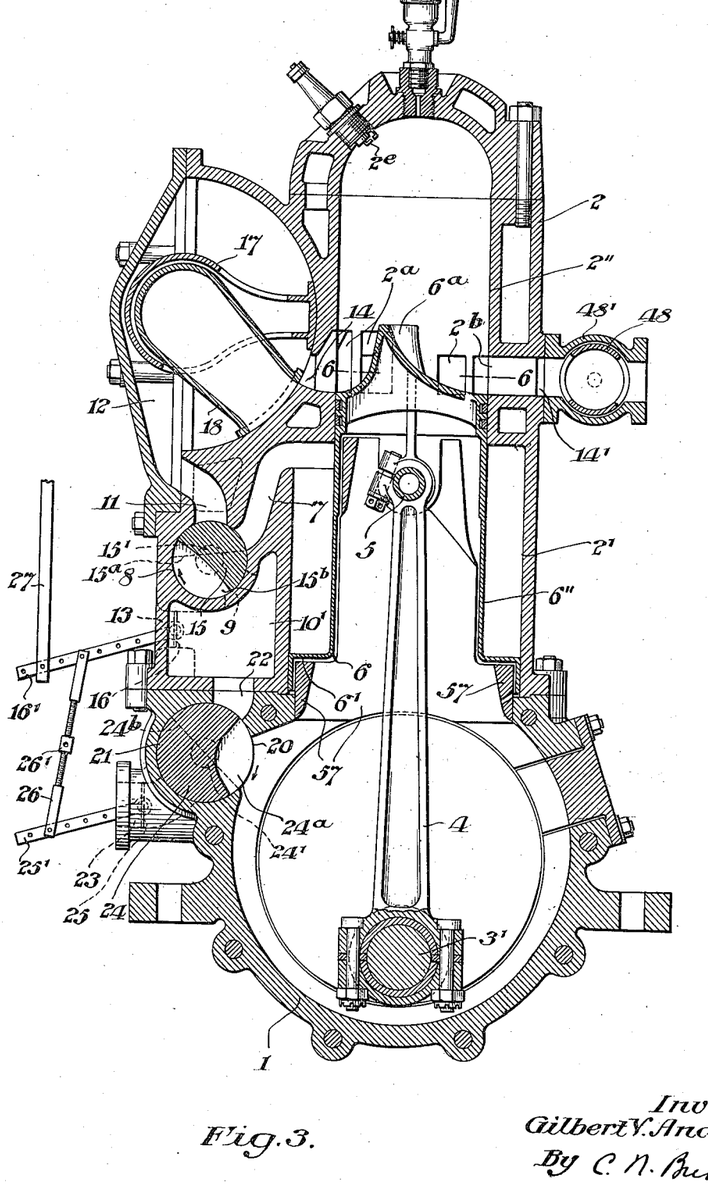
Fig. 3 is a sectional view taken on the line 3—3 of Fig. 2.
Figures 4, 5, 6:
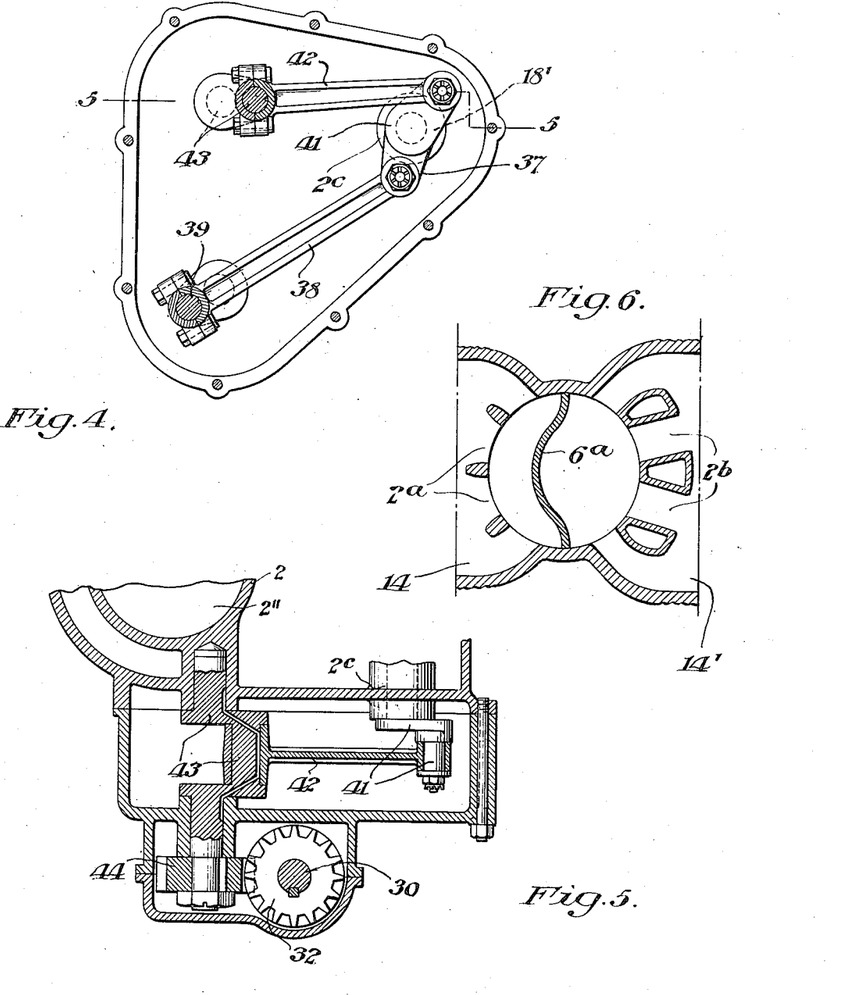
Fig. 4 is a sectional view taken on the line 4—4 of Fig. 2.
Fig. 5 is a sectional view taken on the line 5—5 of Fig. 4.
Fig. 6 is a section taken on the line 6—6 of Fig. 3.
Figure 7:
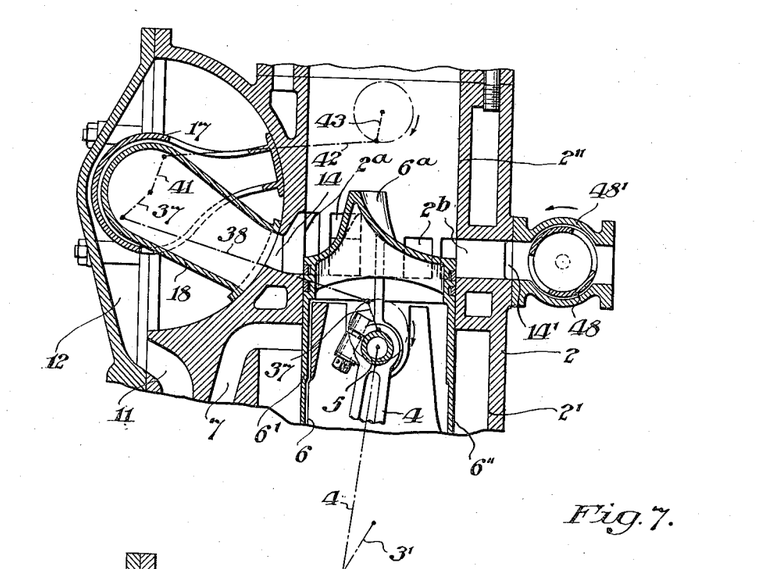
Fig. 7 is a broken sectional view illustrating the relative positions of the piston and valves for admission of gas.
Figure 8:
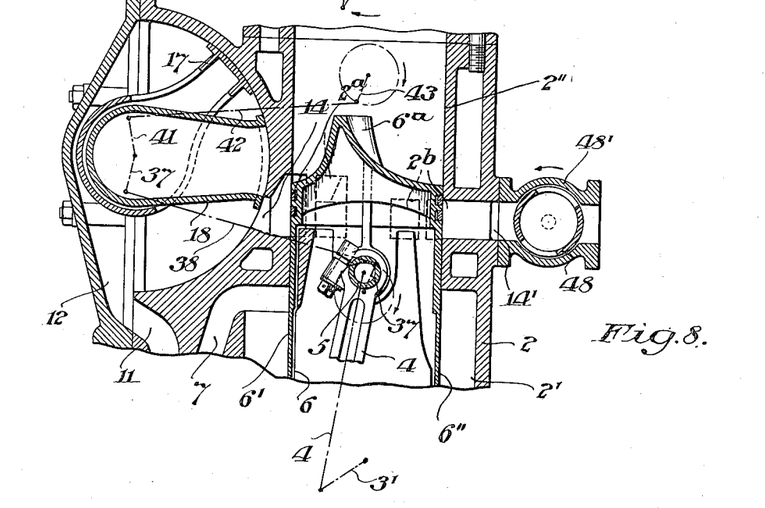
Fig. 8 is a broken sectional view illustrating the relative positions of the piston and valves for admission of air.

In operation, when the piston 6 has descended on its working stroke until it uncovers the exhaust ports $2^b$, the burnt gas in the chamber 2″ escapes under its own pressure through these ports and the outlet 14′, subject to regulation by the now open valve 48; and air under pressure is admitted to the chamber through the ports $2^a$ from the passage 14 and reservoir 12, the valves 17 and 18 being on opposite sides of such passage, as shown in Fig. 3. The baffle $6^a$ on the piston 6, now being disposed between the inlet and outlet ports, deflects the incoming air upwardly to the top of the chamber 2″ where it is deflected downwardly and flows through the outlet ports, thus scavenging the chamber of burnt gas prior to the admission of live gas. Sufficient air having been admitted to the chamber 2″ for clearing it of burnt or dead gas, the gas valve 18 comes into registration with the passage 14, as illustrated in Fig. 7, and gas under pressure is delivered to the chamber from the reservoir 19, through the valve 18, the passage 14 and the ports $2^a$. The proper amount of gas having been admitted, the valves 17 and 18 move to the positions shown in Fig. 8, permitting a limited amount of air to flow from the reservoir 12 through the passage 14 and ports $2^a$ to blow gas remaining in such passage and ports into the explosion chamber, where it is utilized, instead of being wasted by remaining in such passage and ports. As the piston ascends, it compresses the charge until the upper end of the stroke is reached, when the compressed charge is ignited by means of the spark plug 2ᵃ, the explosion driving the piston down on its working stroke.

During the descent of the piston, air is drawn into the compression chamber 2′, through the passages 10 and 7 now connected by the port 15ᵃ of the valve 15, the passage 11 being closed and the air in the chamber 12 permitted to escape only through the passage 14 to scavenge the explosion chamber. Simultaneously therewith, gas under pressure flows from the chamber 1 through the passages 20 and 22, now connected through the port 24ᵃ of the valve 24, and through the passages 10′ and 19 into the valve 18, whence it flows through the passages 14 and 2ᵃ into the explosion chamber 2″, in sequence with the air, as the valves 17 and 18 move from the position shown in Fig. 3 to that shown in Fig. 7. When the piston ascends and the valves 17 and 18 move from the positions shown in Fig. 7 to those shown in Fig. 8, the valves 15 and 24 move in the directions of the arrows thereon, the valve 15 closing communication between the passages 7 and 10 while opening communication between the passages 7 and 11, to permit air to be forced from the cylinder 2″ into the chamber 12 and thence through the passages 14 and 2ᵃ prior to their closure by the piston, and the valve 24 closing the passage 22 and connecting the port 20 with the gas inlet 23 through the port 24ᵇ to permit gas to be sucked into the crank case 1.

In operating at high altitudes, the valve 18 is set to keep the pressure in the gas reservoir as near the prevailing atmospheric pressure as possible, in order to keep the volumetric efficiency of the crank case and gas pump as high as possible. This requires that only a small amount of air be allowed for scavenging and that as much gas as possible be admitted to the explosion chamber before the closure of the super-compression valve 48, which is closed to prevent the escape of gas that would otherwise take place at high altitudes and is timed to close prior to the closure of the exhaust ports by the piston, thus trapping the extra volume of air and gas provided at high altitudes.

As the positively actuated valves controlling the separate admission of compressed air and gas to the explosion chamber are outside of the cylinder and apart from the piston, a more effective control of the ports is effected than where the piston is used as a part of the valve mechanism, and by the provision of the oscillatory valves with a radius greater than that of the cranks by which they are operated, a much greater valve displacement is obtained than would be provided by the piston.

The peripheries of the air and gas valves are placed so that there is a slight clearance between them and their seats, which allows for expansion due to heat and secures free action of the parts, the small amount of leakage resulting therefrom being negligible.

The mechanism may be variously modified within the scope of the invention and as different uses may render desirable.

When the engine is not to be used at various altitudes, as in air craft, the adjustable relation between the valves for controlling the admission of air and gas to the explosion chamber will generally be eliminated, as also the auxiliary valve mechanism for controlling the exhaust.

Figures 9, 10:
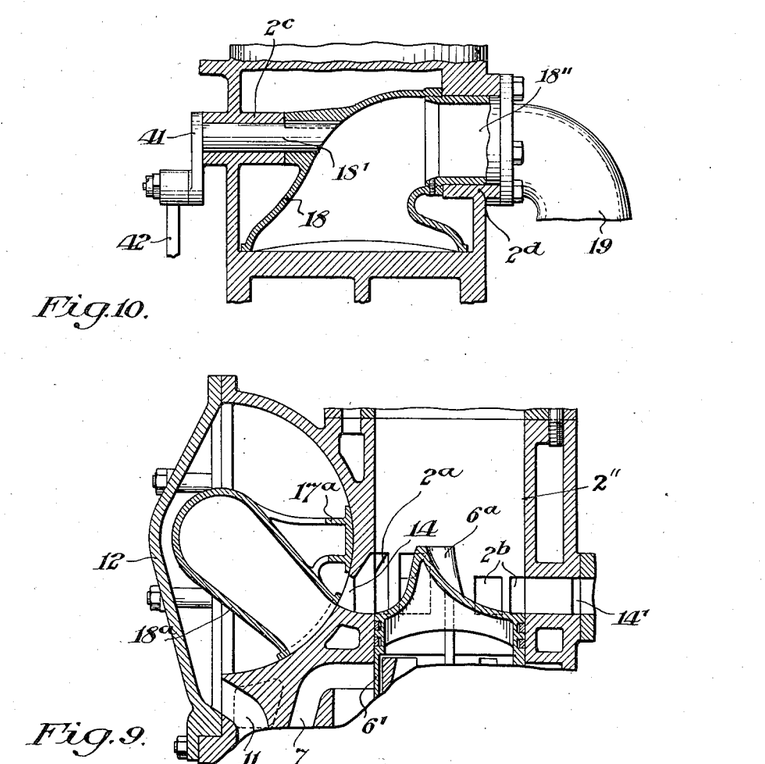
Fig. 9 is a broken sectional view representing a modified form of valve mechanism for controlling the admission of air and gas to the explosion chamber.
Fig. 10 is a broken sectional view taken through the axis of the valve shown in Fig. 9.
Figure 11:
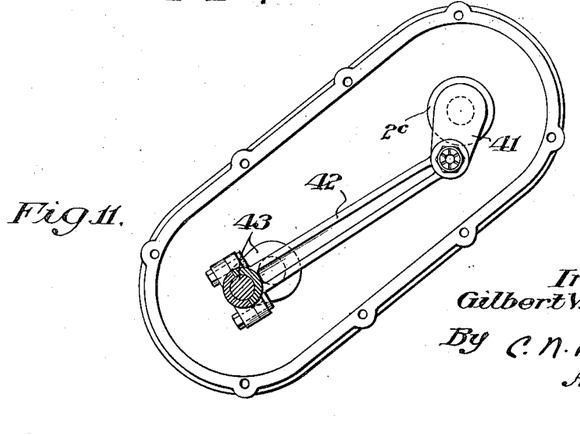
Fig. 11 is a sectional elevation of mechanism for operating the valve mechanism illustrated in Figs. 9 and 10.

As illustrated in Figs. 9, 10 and 11, the air valve 17ᵃ and the gas valve 18ᵃ, for controlling the admission of air and gas respectively to the explosion chamber 2″, are integrally formed or fixed together in non-adjustable relation, the valve 17ᵃ controlling the flow of air from the reservoir 12 through the explosion chamber's inlet passages 14 and 2ᵃ and the valve 18ᵃ connecting these passages with the gas conduit 19. This compound valve, having the journals 18′ and 18″ adapted to turn in the respective bearings 2ᶜ and 2ᵈ, is operated by the crank 41 fixed to the valve and the link 42 connecting this crank with the crank 43 as previously described.

Having described my invention, I claim:

1. In an internal combustion engine, the combination with a cylinder having an explosion chamber and a piston therein, of means comprising a port in said cylinders, for introducing air, gas and air in succession to said chamber prior to the respective strokes of said piston for effecting compression therein and a port in said cylinder through which the waste gases are discharged from said chamber, said piston being adapted for closing said ports.

2. In an internal combustion engine, the combination with a cylinder having inlet and exhaust passages and a piston in said cylinder adapted for closing the communications of said passages therewith, of means for forcing air, gas and air through said inlet passage prior to its closure by said piston on its compression stroke.

3. In an internal combustion engine, the combination with a cylinder having inlet and exhaust passages and a piston in said cylinder adapted for cutting off its communication with said passages, valve mechanisms for controlling the admission of air and gas through said inlet passage to said cylinder and valve mechanism for controlling the escape from said cylinder through said exhaust passage.

4. In an internal combustion engine, the combination with a cylinder having inlet and exhaust passages and a piston in said cylinder adapted for cutting off its communication with said passages, of an oscillatory valve adapted for controlling the admission of air to said inlet, an oscillatory valve adapted for controlling the admission of gas to said inlet, and means for operating said valves in synchronous relation.

5. In an internal combustion engine, the combination with a cylinder having an inlet and a piston in said cylinder, of an air chamber communicating with said inlet, an oscillatory valve in said chamber for controlling the admission of air from said chamber to said inlet, means comprising an oscillatory valve for admitting gas under control to said inlet, and means operated by said piston for oscillating said valves in synchronous relation.

6. In an internal combustion engine, the combination with an explosion chamber, of an air compressor chamber, and a gas compressor chamber having connections communicating therewith, a piston adapted for pumping air and gas through said compressor chambers to said explosion chamber, valve mechanism comprising an oscillatory valve for controlling the admission of air from said air compressor chamber to said explosion chamber, valve mechanism comprising an oscillatory valve for controlling the admission of gas from said gas compressor chamber to said explosion chamber, and means whereby said piston operates said valve mechanisms in synchronous relation.

7. In an internal combustion engine, the combination with a cylinder having an explosion chamber, of an air chamber and a gas chamber having connections communicating with said explosion chamber and a piston for drawing air and gas into the respective chambers therefor on its opposite strokes and alternately therewith forcing said air and gas from the respective chambers therefor through said connections.

8. In an internal combustion engine, the combination with an explosion chamber, an air chamber, and a gas chamber, of means for connecting said air and gas chambers with said explosion chamber, a piston adapted for effecting compression in said explosion and air chambers simultaneously and in said gas chamber alternately therewith and means comprising valve mechanisms operated by said piston for controlling the communication of said air and gas chambers with said explosion chamber.

9. In an internal combustion engine, the combination with a compound cylinder having a crank case connected therewith, a compound piston adapted to operate in said cylinder, a crank adapted to operate in said case, and means whereby said crank operates said piston, passages whereby said piston pumps gas through said case to the explosion chamber of said cylinder, passages whereby said piston pumps air to said explosion chamber and valve mechanisms operated by said piston for controlling said passages.

10. In an internal combustion engine, an explosion chamber having an inlet, an air reservoir communicating with said inlet, an air compressor chamber connected with said reservoir, an oscillatory valve in said reservoir for controlling the admission of air therefrom to said inlet, an oscillatory valve in said reservoir through which gas is communicated to said inlet, a gas compressor chamber connected with said oscillatory valve second named, a piston adapted for pumping air from said compressor chamber first named to said reservoir and gas from said compressor chamber second named to said valve second named, and means whereby said piston operates said valves in synchronous relation.

11. In an internal combustion engine, the combination with a gas chamber, an air chamber and an explosion chamber having an inlet, of means connecting said air chamber with said inlet, a valve exterior to said inlet for controlling the flow of air therethrough from said air chamber to said explosion chamber, means comprising a valve exterior to said inlet for connecting said gas chamber with said explosion chamber through said inlet, and means comprising a piston operating in said explosion chamber for pumping air and gas to and from said air and gas chambers.

12. In an internal combustion engine, the combination with an explosion chamber having an inlet passage and an exhaust passage, a piston movable in said chamber and having a baffle disposed between said passages at the end of the working stroke, and means comprising a journaled crank connected with and operated by said piston, of a journaled air valve adapted for controlling said inlet passage, a hollow gas valve journaled concentrically with said air valve and adapted for registering with said inlet passage, and means whereby said crank operates said valves in synchronous relation and said piston pumps air and gas to said chamber through said inlet passage.

13. In an internal combustion engine, the combination with an explosion chamber having an inlet and a piston in said chamber, of an air valve adapted to register with said inlet, a separately movable gas valve adapted to register with said inlet, and means whereby said piston operates said valves in synchronous relation and pumps air and gas in sequence through said inlet to said chamber.

14. In an internal combustion engine, the combination with an explosion chamber having an inlet and a piston in said chamber, of an air chamber communicating with said explosion chamber through said inlet, a journaled air valve in said air chamber for controlling said inlet, said valve having a hollow body and a part thereon movable over said inlet, a hollow gas valve journaled concentrically with said air valve, said gas valve being partially disposed within the body of said air valve and having a part adapted for registration with said inlet, and means whereby said piston operates said valves in synchronous relation and pumps air into said air chamber and gas into said gas valve.

15. In an internal combustion engine, the combination with an explosion chamber having an inlet and a piston in said chamber, of an air reservoir communicating with said inlet, an oscillatory valve having a relatively large radius in said reservoir and adapted for controlling said inlet, a hollow oscillatory gas valve concentric with said air valve and adapted for registering with said inlet, and means whereby said piston rocks said valves, said means comprising devices fixed to the respective valves and having effective operating radii shorter than those of the respective valves.

16. In an internal combustion engine, the combination with an explosion chamber having an inlet and a piston in said chamber, of a valve adapted for registering with said inlet to control the admission of air thereto, a second valve adapted for registering with said inlet to control the admission of gas thereto, air passages communicating with said inlet under control of said air valve, gas passages communicating with said inlet under control of said gas valve, valves for controlling said air and gas passages, and means whereby said piston operates said valves in synchronous relation and pumps air and gas alternately through said inlet.

17. In an internal combustion engine, the combination with an explosion chamber having an inlet and a piston adapted to act in said chamber, of a valve adapted for registering with said inlet to control the admission of air thereto, a valve adapted to register with said inlet to control the admission of gas thereto, air passages communicating with said inlet under control of said air valve, gas passages communicating with said inlet under control of said gas valve, means whereby said piston operates said valves in synchronous relations, throttle valves for regulating the admission of air and gas to said passages for air and gas respectively, and means connecting said throttle valves for operating them in synchronous relation.

18. In an internal combustion engine, the combination with an explosion chamber having an inlet and a piston adapted to act in said chamber, of a valve adapted to register with said inlet to control the admission of air thereto, a valve adapted to register with said inlet to control the admission of gas thereto, air passages comprising a reservoir communicating with said inlet under control of said air valve, gas passages comprising a reservoir communicating with said inlet under control of said gas valve, valves for controlling the flow of air and gas through said passages respectively to said inlet, and means whereby said piston operates said valves in synchronous relation and pumps air and gas through said passages to said inlet.

19. In an internal combustion engine, the combination with an explosion chamber having an inlet and an outlet, and a piston adapted to reciprocate in said chamber and to cover said inlet and outlet, of a valve for controlling the admission of air to said inlet, a valve for controlling the admission of gas to said inlet, a valve for controlling the exhaust through said outlet, and means whereby said piston operates said valves in synchronous relation.

20. In an internal combustion engine, the combination with an explosion chamber having an exhaust passage and an inlet passage, a piston adapted to operate in said chamber, of a valve mechanism for controlling said exhaust passage, valve mechanism for controlling the admission of air and gas in succession through said inlet passage, and means whereby said piston operates said valve mechanisms to admit air to and exhaust waste gas from said chamber simultaneously.

21. In an internal combustion engine, the combination with an explosion chamber having an exhaust passage and an inlet passage, a piston adapted to operate in said chamber, of a valve mechanism for controlling said exhaust passage, valve mechanism for controlling the admission of air through said inlet passage, means whereby said piston operates said valve mechanism in synchronous relation therewith to open said passages simultaneously, and means for adjusting the time of operation of said valve with relation to the time of operation of said piston.

22. In an internal combustion engine, the combination with an explosion chamber having an inlet and a piston adapted to act in said chamber, of an oscillatory air valve for controlling said inlet, an oscillatory valve for controlling the admission of gas to said inlet, means for varying the operating relations of said valves, and means whereby said piston operates said valves.

23. In an internal combustion engine, the combination with an explosion chamber having an inlet and an outlet, and a piston adapted to operate in said chamber, of a journaled valve for controlling the flow of air through said inlet, a journaled valve for controlling the admission of gas through said inlet, a journaled valve for controlling the exhaust through said outlet, means whereby said piston operates said valves in synchronous relation, means for varying the action of said valve second named with relation to said valve first named, and means for varying the action of said valve third named with relation to said valve first named.

24. In an internal combustion engine, the combination with an explosion chamber having an inlet for air and gas and an outlet for waste products, and a piston adapted to act in said chamber, of a valve for controlling the admission of air to said inlet, a valve for controlling the admission of gas to said inlet, a valve for controlling the exhaust through said outlet, passages through which said piston pumps air to said inlet, passages through which said piston pumps gas to said inlet, valves for controlling the respective air and gas passages, and means whereby said piston operates said valves in synchronous relation.

25. In an internal combustion engine, the combination with a chamber having an outlet and an inlet, and a piston adapted to act in said chamber, of a valve for controlling the admission of air to said inlet, a valve for controlling the admission of gas to said inlet, a valve for controlling the exhaust through said outlet, passages through which said piston pumps air to said inlet, passages through which said piston pumps gas to said inlet, means whereby said piston operates said valves in synchronous relation, and throttle valves for controlling the respective air and gas passages.

26. In an internal combustion engine, the combination of an explosion chamber having a port, a piston adapted to act in said chamber, and means comprising a journaled crank shaft revolved by said piston, of a valve for controlling said port, means comprising a helical gear for operating said valve, a helical gear on said crank shaft, and means comprising a journaled shaft having helical gears thereon engaging the respective helical gears aforesaid whereby said crank shaft operates said valve.

27. In an internal combustion engine, the combination with an explosion chamber having a port, a piston adapted to operate in said chamber, and means comprising a journaled crank shaft and a gear thereon revolved by said piston, of a valve for controlling said port, means comprising a gear for operating said valve, a journaled shaft having gears thereon meshing with the respective gears aforesaid, a pair of said gears meshing as aforesaid having helical teeth, and means for adjusting one of said helical gears with relation to the other and thereby adjusting the action of said valve with relation to that of said piston.

28. In an internal combustion engine, the combination with an explosion chamber having a port, a piston adapted to operate in said chamber, and means comprising a journaled crank shaft and a gear thereon revolved by said piston, of an oscillatory valve for controlling said port, a crank connected with said valve for operating it, a journaled shaft provided with a gear and a crank, a link for connecting said cranks, and a journaled shaft having thereon gears engaging the respective gears aforesaid, whereby said crank shaft oscillates said valve.

29. In an internal combustion engine, the combination with an explosion chamber having an inlet port, a piston adapted to act in said chamber, and means comprising a crank shaft with a gear thereon revolved by said piston, of a pair of oscillatory valves having cranks thereon for controlling the admission of air and gas to said port, links connected with the respective cranks for oscillating them, a pair of journaled shafts having cranks thereon connected with the respective links and gears on said journaled shafts for revolving them, and a journaled shaft having gears thereon engaging the respective gears aforesaid, whereby said crank shaft oscillates said valves.

30. In an internal combustion engine, the combination with a combustion chamber having an inlet, a piston adapted to act in said chamber, and means comprising a journaled crank shaft with a gear thereon operated by said piston, of a pair of oscillatory valves for controlling said inlet, means comprising gear wheels for oscillating said valves, means comprising passages and rotary valves therein whereby said piston pumps air and gas to said inlet, gear wheels fixed to said rotary valves, and a journaled shaft having gear wheels thereon meshing with the respective gear wheels aforesaid.

31. In an internal combustion engine, the combination with a cylinder having inlet and exhaust passages and a piston in said cylinder adapted for cutting off its communication with said passages, of oscillatory valve mechanism adapted for controlling the admission of air and gas to said cylinder through said inlet, and means for operating said valve mechanism.

32. In an internal combustion engine, the combination with a cylinder having inlet and exhaust passages and a piston in said cylinder, of oscillatory valve mechanism adapted for controlling the admission of air and gas to said cylinder through said inlet, and means for operating said valve mechanism.

33. In an internal combustion engine, the combination with a cylinder having an inlet and a piston in said cylinder, of an air chamber communicating with said inlet, means in said chamber comprising an oscillatory valve for controlling the admission of air from said chamber to said inlet and controlling the admission of gas to said inlet and means for operating said oscillatory valve.

34. In an internal combustion engine, an explosion chamber having an inlet, an air reservoir communicating with said inlet, an air compressor chamber connected with said reservoir, an oscillatory valve in said reservoir for controlling the admission of air therefrom to said inlet, an oscillatory valve in said reservoir through which gas is communicated to said inlet, a gas compressor chamber connected with said oscillatory valve second named, a piston adapted for pumping air from said compressor chamber first named to said reservoir and gas from said compressor chamber second named to said valve second named, means whereby said piston operates said valves in synchronous relation, and means for independently adjusting the timing of said oscillatory valve second named.

In testimony whereof I have hereunto set my name this 27th day of April, 1918.

GILBERT V. ANDERSON.